June 12, 1951 L. A. MEACHAM 2,556,286

OSCILLATION GENERATOR

Filed Dec. 29, 1948

INVENTOR
L. A. MEACHAM
BY Harry C. Hart
ATTORNEY

UNITED STATES PATENT OFFICE 2,556,286

OSCILLATION GENERATOR

Larned A. Meacham, New Providence, N. J., assignor to Bell Telephone Laboratories, Incorporated, New York, N. Y., a corporation of New York Application December 29, 1948, Serial No. 67,920

5 Claims. (Cl. 250—36)

This invention relates to the generation of oscillations with the aid of semiconductor amplifiers and to novel self-oscillation circuits therefor.

The principal object of the invention is to draw a maximum amount of power from a semiconductor oscillator and supply it to a load, consistent with the maintenance of self-oscillation at a desired power level.

The invention utilizes as its central element a three-electrode semiconductor amplifier of the type which forms a part of the subject-matter of United States Patent 2,524,035, which issued on October 3, 1950, on an application of John Bardeen and Walter H. Brattain, Serial No. 33,466, filed June 17, 1948. This application is a continuation-in-part of an earlier application of the same inventors, Serial No. 11,165, filed February 26, 1948, and, after the filing of the later application, allowed to become abandoned. This central element comprises a small block of semiconductor material such as germanium having, in its original form, at least three electrodes electrically coupled thereto, which are termed the emitter, the collector, and the base electrode. The emitter and the collector may be point contact electrodes making rectifier contact with the block, while the base electrode may be a plated metal film providing a low resistance contact. The emitter may be biased for conduction in the forward direction while the collector is biased for conduction in the reverse direction. The application of a signal to the emitter produces a signal frequency current in the collector and in an external circuit connected thereto which may include a load. By reason of certain phenomena which take place within the block, amplified versions of the voltage, current and power of the original signal appear in the load.

The device, which may take various forms, has received the appellation "Transistor" and will be so designated in the present specification.

It is pointed out in the aforementioned Bardeen-Brattain applications that, by feeding back a portion of the output voltage in proper phase to the input terminals, the device may be caused to oscillate at a frequency determined by its external circuit elements, and those applications disclose a self-oscillation circuit in which the collector, as output terminal, is coupled back to the emitter as input terminal for the maintenance of such oscillations. Following the example of conventional vacuum tube circuitry, the load is placed in circuit with the output electrode, namely, the collector.

The characteristics of the transistor, however, differ widely from those of the more conventional vacuum tube. Chief among these differences is that the impedance of the emitter is much lower than the impedance of the collector. Specifically, the emitter impedance in typical cases is of the order of 500 ohms while the collector impedance is of the order of 20,000 to 50,000 ohms. Therefore the emitter draws a substantial signal frequency current, as compared with the grid of a vacuum tube triode which draws substantially no current at all.

The present invention acknowledges these and other characteristic differences between the transistor and the conventional vacuum tube, and furnishes principles of design which take full advantage of them. In particular, it is recognized that, in the transistor oscillator, the collector is the power source while the emitter, the tuning elements, and the load are all power sinks and that, therefore, no one of these three circuits can safely be matched to the other taken by itself, but rather the collector, as power source, should be matched in impedance to the load, the tuning elements and the emitter taken together; and that, furthermore, the optimum arrangement is not merely one in which the load, the tuning elements and the emitter taken together receive a maximum amount of power from the collector, but that a further requirement exists for optimum operation; namely, that the power be divided between the load and tuning elements on the one hand, and the emitter on the other in such a way that the emitter receives only enough of the collector power to maintain self-oscillation while the load and tuning elements receive the balance.

The invention provides specific circuit arrangements in which these general principles are embodied and implemented, and formulae are developed which enable the designer to arrive at optimum values of the circuit parameters directly and easily.

It is a feature of the invention that a low impedance load is preferably connected with the emitter of the transistor rather than with the collector, which would be the case if the analogy with the vacuum tube oscillator art were followed.

It is a further feature that the load may, in general, be connected either in parallel with the emitter or in series with it, although, depending upon circumstances, one of these connections may be preferable to the other.

The invention will be fully apprehended from the following detailed description of certain illustrative embodiments, taken in connection with the appended drawings, in which.

Figure 1:
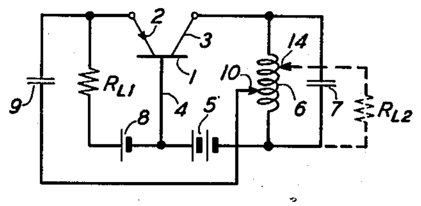
Fig. 1 is a schematic circuit diagram of a transitor oscillator network, back-coupled and loaded in accordance with the invention.

Referring now to the drawings, there is shown in Fig. 1 a transistor comprising a block or wafer 1 of semi-conducting material such as germanium which has been suitably prepared, and having an emitter 2, a collector 3, and a base electrode 4. In series between the base and the collector are connected a source of direct current such as a battery 5, and a parallel-tuned or antiresonant circuit comprising a coil 6 in parallel with a condenser 7. In series between the base and the emitter are connected a direct current source 8 and a load resistor $R_{L_1}$. A blocking condenser 9 is connected between a tap 10 on the coil 4 and the emitter terminal 2 of the transistor. The polarities and voltages of the direct current sources 5 and 8 are so chosen that the emitter operates in the "forward" or low-impedance direction while the collector operates in the "reverse" or high-impedance direction. In particular, for a transistor of N-type germanium, as explained in the Bardeen-Brattain patent applications to which reference has been made earlier, the emitter may have a mean potential of the order of +0.5 volt and the collector −40 volts, both being measured with respect to the base electrode.

For these bias conditions, the emitter of a typical transistor exhibits a low variational impedance, of the order of 300 ohms, while the collector has a relatively high variational impedance, of approximately 30,000 ohms. Furthermore, when a signal is impressed upon the emitter in addition to the bias, an amplified copy thereof is delivered to a suitable terminating impedance in the collector circuit. The power amplification thus obtained may be as great as 100 to 1, or 20 decibels. Accordingly, in an ideal oscillator, only about 1 per cent of the power delivered from the collector would need to be fed back to energize the emitter, thus leaving 99 per cent available for supplying losses in the tuning elements, and for delivery as useful power to a load. The oscillator of the present invention approaches this ideal. It fails to reach it in practice only in so far as additional power may be devoted to the emitter, causing moderate overload and a corresponding reduction of gain in the transistor, for the sake of insuring continued oscillation in spite of possible changes of bias potentials, temperature, or other operating condition.

Figure 2:
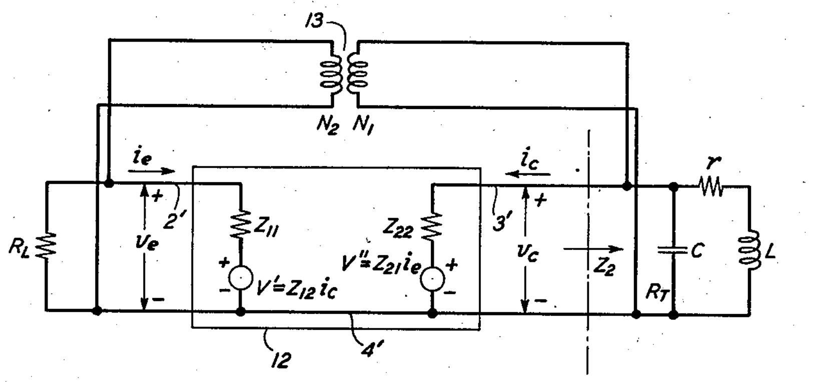
Fig. 2 is an equivalent circuit diagram useful in explaining the operation of Fig. 1.

The operation of the oscillator may be fully understood by reference to Fig. 2 in which the transistor is represented in the form known as an "equivalent four-pole" 12 having input terminals 2' and 4' and output terminals 3' and 4', where the leads 2', 3', 4' correspond to the transistor electrodes 2, 3, 4, respectively. The general principles underlying the use of such an equivalent four-pole to represent a network containing an amplifier or other active element are explained in an article by L. C. Peterson entitled "Equivalent Circuits of Linear Active Four-Terminal Networks" published in volume 27 of the Bell System Technical Journal for October 1948, page 593. Its application to networks including transistors is discussed in an application of H. L. Barney, Serial No. 58,684, filed November 6, 1948. The variational or alternating-current characteristics of the transistor are fully represented by the elements shown in the figure, namely, a self-impedance $Z_{11}$ and a transfer impedance $Z_{12}$ in the internal emitter-to-base path, and by a self-impedance $Z_{22}$ and a transfer impedance $Z_{21}$ in the internal collector-to-base path. For any frequency in the range from zero to approximately one megacycle, these impedances are essentially non-reactive. Accordingly they are assumed herein to be pure resistances. The two transfer impedances may conveniently be thought of as generators, as drawn in Fig. 2, each producing a potential proportional to the current in the opposite branch of the equivalent circuit. That is, the passage of a current $i_c$ inward to the collector causes a potential $v'$ equal to $Z_{12}i_c$ in the emitter-to-base path, so poled as to make the emitter terminal more positive. Similarly, the passage of current $i_e$ inward to the collector produces a potential $v''$ equal to $Z_{21}i_e$ in the collector-to-base path so poled as to make the collector more positive. The magnitudes of these four impedances in a typical case may be:

$Z_{11}$=400 ohms
$Z_{12}$=100 ohms
$Z_{22}$=30,000 ohms
$Z_{21}$=50,000 ohms

Assume now that the emitter current $i_e$ has a suitable operating value, which as has been seen may moderately overload or exceed the linear range of the transistor, and for this value let the quantities $Z_{11}$, $Z_{12}$, $Z_{22}$ and $Z_{21}$ be determined in accordance with the principles of the invention. The collector current is then:

$$i_c=\frac{-Z_{21}i_e}{Z_{22}+Z_2}$$

where $Z_2$ is the aggregate external impedance in the collector circuit as symbolized by an arrow in Fig. 2. The total power delivered to the impedance $Z_2$ will be a maximum, in accord with well-known principles, when $Z_2=Z_{22}$. Hence this is a desired condition, and will be tken as a requirement in proportioning the parameters of the oscillator. Accordingly, $$i_c=\frac{-Z_{21}i_e}{2Z_{22}}$$

the variational component $v_c$ of the collector potential is $$v_c=-Z_{22}i_c=\frac{Z_{21}i_e}{2}$$

and the total power from the collector is $$P_c=v_ci_c=\frac{Z_{21}^2i_e^2}{4Z_{22}}$$

Now in order to produce the assumed current $i_e$, a voltage $v_e$ must be applied to the emitter. From the figure, its magnitude is $$v_e=Z_{11}i_e+Z_{12}i_c=\left(Z_{11}-\frac{Z_{12}Z_{21}}{2Z_{22}}\right)i_e$$

Accordingly, an amount of power equal to $$P_e=v_ei_e=\left(Z_{11}-\frac{Z_{12}Z_{21}}{2Z_{22}}\right)i_e^2$$

must be supplied to the emitter and may be taken from the power $P_c$ available at the collector. To symbolize the method of the invention for accomplishing this, an ideal transformer 13 is shown coupling the collector circuit with the emitter circuit. It has a ratio of primary turns $N_1$ to secondary turns $N_2$ which is preferably equal to $$\frac{N_1}{N_2}=\frac{v_c}{v_e}=\frac{Z_{21}Z_{22}}{2Z_{11}Z_{22}-Z_{12}Z_{21}}$$

Now the total power $P_c$ delivered by the collector must be equal, in the absence of other power sources, to the sum of the powers $P_e$, $P_T$ and $P_L$ absorbed by the emitter, the tuning elements L, r, C and the load, respectively. Thus $$P_c=P_e+P_T+P_L$$

But, if oscillations are to be maintained at the assumed power level, $P_e$ is a fixed quantity, so that the power available for apportionment between the tuning elements and the load is $$P_T+P_L=P_c-P_e$$

The apportionment of this power as between the tuning elements and the load is at the disposal of the designer, and must in general represent a compromise between conflicting considerations of maximum output power on the one hand and frequency stability and purity of wave form on the other. Thus, if optimum purity of wave form is required, the tuning elements must absorb the greater part of the available power, and $P_T$ is larger than $P_L$. If, on the other hand, wave form purity and stability are not controlling considerations while all possible power output is desired, then $P_L$ is larger than $P_T$. A fair compromise, suitable for conditions likely to be encountered in practice, is to apportion the available power equally between the tuning elements and the load, thus making $$P_L=P_T=\left(\frac{P_c-P_e}{2}\right)=\frac{v_c^2}{R_T}=\frac{v_e^2}{R_L}$$

where $R_T$ and $R_L$ are the effective resistances of the tuning elements and of the external load, respectively.

From this it follows that $$R_T=\frac{L}{rC}=\frac{2v_c^2}{P_c-P_e}$$

and $$R_L=\frac{2v_e^2}{P_c-P_e}$$

By means of the preceding equations, all of the parameters $v_c$, $v_e$, $P_c$ and $P_e$ may be expressed in terms of $i_e$ and the four internal impedances of the transistor which apply (in view of overload) for the chosen value of $i_e$. If the values of these impedances given earlier are taken to apply for a sinusoidal emitter current of 1 milliampere (root mean square value) the following typical values are obtained.

$i_e$=1 milliampere
$i_c$=0.833 milliampere
$v_c$=25 volts
$P_c$=20.8 milliwatts
$v_e$=0.317 volt
$P_e$=0.317 milliwatt
$\frac{N_1}{N_2}=79$
$P_T$=10.24 milliwatts
$P_L$=10.24 milliwatts
$R_T$=61,000 ohms
$R_L$=9.75 ohms By comparing the values, in this tabulation, of $P_c$, $P_e$, $P_T$ and $P_L$, it may be noted that the sum of the last two is equal to the difference of the first two; i. e., that after furnishing the emitter with the power required to maintain the desired condition of self-oscillation, all of the remainder is economically utilized in the tuning elements and the external load; and that the two last-named power sinks absorb equal amounts of power, in accordance with the compromise adopted.

If, in the foregoing example, a larger value of variational emitter current $i_e$ had been taken, such as 2 milliamperes, different effective values of $Z_{11}$, $Z_{12}$, $Z_{22}$ and $Z_{21}$ would have resulted from non-linearity of the transistor, so that neither $i_c$ nor $v_c$ would increase in direct proportion. Some increase in these quantities would, however, result. In particular, it may be seen that when the peak amplitude of the alternating component ($v_c$) of the collector potential is so increased that it reaches the value of the steady bias component thereof, the collector no longer operates in the "reverse" direction, but rapidly acquires a low impedance, associated with "forward" operation. This rapid change of collector impedance causes harmonic distortion of the oscillator output, which may be undesirable, but on the other hand it provides a limiting action which tends to regulate the amplitude of $v_c$ at a value approximately equal to the collector bias. In some applications the latter property may be utilized to advantage, since in the circuit of Fig. 2 it also stabilizes the amplitude of the voltage $v_2$ across the road $R_L$.

Returning now to Fig. 1, it may be seen that it can be derived from Fig. 2 merely by replacing the ideal transformer 13 by a tap 10 on the tuning inductance 6 at a point $N_2$ turns from the lower terminal of the winding (the total number of turns being $N_1$), and adding the blocking condenser 9 and direct current sources 5, 8. The low-impedance load $R_{L_1}$ corresponds to $R_L$ of Fig. 2. On the other hand, if preferred, a load $R_{L_2}$ of high impedance may be connected across a fraction or all of the inductance 6, as by way of the tap 14, the tap being so located as to deliver the allotted power to the load. When this is done, a moderately large resistance or inductance is used in place of the load for $R_{L_1}$, this element then drawing little or no power from the oscillator, but providing a path for direct current to the emitter.

Figure 3:
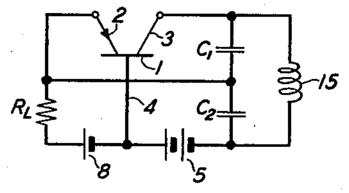
Figs. 3, 4 and 5 are schematic diagrams of transistor oscillator networks which are alternative to the oscillator network of Fig. 1.

Fig. 3 shows another embodiment, in which the impedance transformation symbolized by the ideal transformer 13 of Fig. 2 is obtained by means of a coil 15 antiresonant with two condensers $C_1$ and $C_2$ in series, the emitter 2 being connected to their common terminal. Here the operation is essentially the same as in Fig. 2, the function of the ideal transformer 13 being performed by the two condensers in accord with well-known principles. To secure the same transformation ratio requires that $$\frac{\frac{1}{\omega C_1}+\frac{1}{\omega C_2}}{\frac{1}{\omega C_2}}=\frac{N_1}{N_2}$$

or $$\frac{C_2}{C_1}=\frac{N_1}{N_2}=1$$

Figure 4:
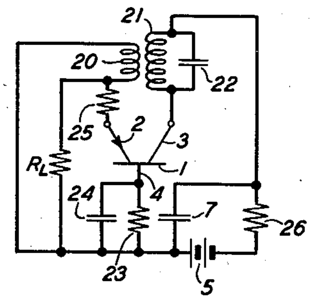

In Fig. 4, another embodiment of the invention is shown, wherein a secondary winding 20, closely coupled to a primary coil 21 tuned by a condenser 22, is used to supply power at low impedance to the emitter 2 and to the load $R_L$. In this case the turns ratio of primary to secondary is $$\frac{N^1}{N_2}$$

as in the ideal transformer 13 of Fig. 2. One advantage of this arrangement over those of Fig. 1 and Fig. 3 is that a direct-current path to the emitter is afforded by way of the secondary winding 20 and hence that the load $R_L$ is not required to carry the steady component of the emitter current.

On the other hand, this arrangement establishes a path from the source 5 to the emitter 2 which includes only the impedance of the secondary winding 20. At very low frequencies and, in the limit for direct current, this impedance is merely the residual resistance of the coil 20. Now at the same low frequencies, the condenser 24 provides very little shunting of the resistor 23 so that current feedback from the collector 3 directly to the emitter 2, independently of the transformer 20, 21, is promoted. This situation may result in instability or spurious oscillations at unwanted frequencies. These may be prevented by inclusion of a resistor 25 in series with the emitter.

Another resistor 26 is connected in series with the collector to prevent possible damage to the transistor through passage of excess collector current from the source 5. To prevent it from absorbing substantial power at the desired frequency of oscillation, it is by-passed by a condenser 27.

Fig. 4 also illustrates the use of a self-biasing arrangement, as described in United States Patent 2,517,960, which issued August 8, 1950, on an application of H. L. Barney and R. C. Mathes, Serial No. 22,854, filed April 23, 1948 in which a resistor 23, shunted by a by-pass condenser 24, is connected between the base terminal 4 of the transistor and the junction of the emitter and collector paths. In a typical transistor under normal conditions of bias, the direct component of collector current, flowing outward from the transistor, exceeds the inward flowing direct current of the emitter, and as a result there is an inward-flowing current to the base terminal. If passed through a suitable resistor, this base current may be used to bias the base negatively, and thus to make the emitter positive with respect to the base. Accordingly the direct current source in the emitter path may be eliminated. The biasing resistor 23 is by-passed by the condenser 24 to prevent it from affecting variational components of the base current at the frequency of oscillation.

Figure 5:
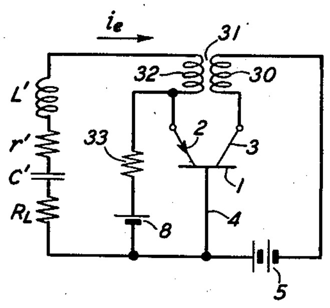

Fig. 5 shows still another circuit configuration embodying the principles of the invention, in which a series-resonant circuit L′, $r'$, C′ is employed. The primary winding 30 of a transformer 31, having a turns ratio $$\frac{N_1}{N_2}$$

is connected between the direct-current source 5 and the collector 3. The secondary winding 32 is connected in series with a tuning inductance L′ having a resistance $r'$, a tuning condenser C′, the load $R_L$, and the base-to-emitter path within the transistor. Emitter bias may be provided by means of a source 8 and a resistor 33 preferably having a value at least several times that of the emitter-to-base impedance. In this circuit, the same variational current $i_e$ flows through each of the series-connected elements listed above (neglecting the small current by-passed around the emitter through the resistor 33). Accordingly, the amounts of power allotted to the load, the series-resonant elements, and the emitter are proportional to their respective resistive impedances, and these may be suitably proportioned in accordance with the general principles described in connection with Fig. 2. The transformer turns ratio $$\frac{N_1}{N_2}$$

is then so chosen that the collector impedance $Z_{22}$ is matched to the impedance $Z_2$ which it faces; namely, the impedance presented by the primary of the transformer. Thus the total available power of the transistor is utilized, being distributed as required among tuning elements, the emitter, and load.

What is claimed is:

1. An oscillation generator which comprises a transistor having a base electrode, an emitter electrode of relatively low impedance and a collector electrode of relatively high impedance, an external network interconnecting said electrodes, said network including a path extending from the collector electrode to the emitter electrode by way of which collector output power is fed back to the emitter, said network including also a reactive frequency-determining circuit, and a low impedance load connected between the emitter electrode and the base electrode.

2. Apparatus as defined in claim 1 wherein the frequency-determining circuit is an antiresonant circuit connected between the collector and the base, said antiresonant circuit comprising a parallel combination of a coil and a condenser, said coil having a connection point intermediate its ends, and wherein the feedback path includes a conductor interconnecting said connection point with the emitter.

3. Apparatus as defined in claim 1 wherein the frequency-determining circuit is an antiresonant circuit, comprising a coil and two series-connected condensers in shunt with said coil, connected between the collector and the base, and wherein the feedback path includes a conductive connection extending from the common terminal of said condensers to the emitter.

4. Apparatus as defined in claim 1 wherein the frequency-determining circuit is an antiresonant circuit, comprising a primary coil and a condenser in shunt with said coil, connected in series between the collector and the base, and wherein the feedback path includes a secondary coil, inductively coupled to said primary coil, connected in series between the emitter and the base.

5. Apparatus as defined in claim 1 wherein the feedback path comprises a primary winding interconnecting the collector with the base and a secondary winding, inductively coupled to said primary winding, interconnecting the emitter with the base, and wherein the frequency-determining circuit is a series-resonant circuit comprising a coil and a condenser connected in series between said secondary coil and the base.

LARNED A. MEACHAM.

No references cited.